United States Patent
Aull et al.

(10) Patent No.: US 7,697,737 B2
(45) Date of Patent: Apr. 13, 2010

(54) METHOD AND SYSTEM FOR PROVIDING FINGERPRINT ENABLED WIRELESS ADD-ON FOR PERSONAL IDENTIFICATION NUMBER (PIN) ACCESSIBLE SMARTCARDS

(75) Inventors: Kenneth Wagner Aull, Fairfax, VA (US); Erik J. Bowman, McLean, VA (US)

(73) Assignee: Northrop Grumman Systems Corporation, Los Angeles, CA (US)

(*) Notice: Subject to any disclaimer, the term of this patent is extended or adjusted under 35 U.S.C. 154(b) by 1079 days.

(21) Appl. No.: 11/362,205

(22) Filed: Feb. 27, 2006

(65) Prior Publication Data

US 2006/0226951 A1    Oct. 12, 2006

Related U.S. Application Data

(60) Provisional application No. 60/664,943, filed on Mar. 25, 2005.

(51) Int. Cl.
*G06K 9/00*    (2006.01)
*G06K 9/68*    (2006.01)

(52) U.S. Cl. ........................ 382/124; 382/218

(58) Field of Classification Search ................. 382/115, 382/124, 117, 118, 119, 209, 218; 340/5.52, 340/5.53, 5.54, 5.8, 5.81, 5.82, 5.83; 713/186; 902/3

See application file for complete search history.

(56) References Cited

U.S. PATENT DOCUMENTS

| | | | |
|---|---|---|---|
| 5,526,428 A * | 6/1996 | Arnold | 713/159 |
| 6,084,967 A * | 7/2000 | Kennedy et al. | 380/247 |
| 6,257,486 B1 * | 7/2001 | Teicher et al. | 235/380 |
| 7,260,237 B2 * | 8/2007 | Nishimoto et al. | 382/100 |
| 7,278,025 B2 * | 10/2007 | Saito et al. | 713/185 |
| 7,376,839 B2 * | 5/2008 | Carta et al. | 713/185 |
| 2001/0017584 A1 * | 8/2001 | Shinzaki | 340/5.52 |
| 2002/0095608 A1 * | 7/2002 | Slevin | 713/202 |
| 2004/0039914 A1 * | 2/2004 | Barr et al. | 713/176 |
| 2005/0071632 A1 * | 3/2005 | Pauker et al. | 713/165 |
| 2005/0247776 A1 * | 11/2005 | Harper et al. | 235/380 |
| 2006/0231625 A1 * | 10/2006 | Cumming et al. | 235/454 |

* cited by examiner

*Primary Examiner*—Daniel G Mariam
(74) *Attorney, Agent, or Firm*—Andrews Kurth LLP (57) ABSTRACT

A method and system use a biometric personal identity verification (BioPIV) system to provide a fingerprint enabled wireless add-on for personal identification number (PIN) accessible smartcards. The BioPIV system may function as a trusted biometric reader and a smartcard reader with full remote functionality for both logical and physical access.

35 Claims, 7 Drawing Sheets

METHOD AND SYSTEM FOR PROVIDING FINGERPRINT ENABLED WIRELESS ADD-ON FOR PERSONAL IDENTIFICATION NUMBER (PIN) ACCESSIBLE SMARTCARDS

RELATED APPLICATION

This application claims the benefit of U.S. Provisional Application Ser. No. 60/664,943, entitled "Method and System for Providing Fingerprint Enabled Wireless Add-On for Personal Identification Number (PIN) Accessible Smartcards," filed on Mar. 25, 2005.

TECHNICAL FIELD

The technical field relates to personal identification systems, and, in particular, to a method and system for providing a fingerprint enabled wireless add-on for personal identification number (PIN) accessible smartcards.

BACKGROUND

The Homeland Security Presidential Directive 12 (HSPD-12) required the National Institute of Standards and Technology (NIST) to issue a Federal Information Processing Standard (FIPS-201) for secure and reliable forms of identification. The FIPS-201 standard, entitled Personal Identity Verification (PIV) for Federal Employees and Contractors, specifies the architecture and technical requirements for a common identification standard, including components, interfaces, support services, and life cycle management functions. The FIPS-201 standard also supports interoperability among identification cards, electronic card readers, communications systems, and access control system interfaces.

The FIPS-201 standard indicates that federal policy is to issue smartcards for both logical and physical access to federal spaces, without waiver, for all federal agencies and their contractors. The Office of Management and Budget (OMB) requires implementation plans for each agency, with required personnel vetting processes and procedures. OMB also requires that PIV smartcards replace all new or refreshed identification (ID) cards, with all physical access systems to be updated.

All employees and contractors of Federal Agencies are required under the FIPS-201 standard to possess a PIV smartcard. Unfortunately, the PIV smartcard contains only short-range radio frequency (RF) capability for physical access, and contains no capability for reading and verifying biometrics to enable logical and physical access at a distance.

Current technologies have capabilities for medium-range (100-300 ft) physical access and logical access and for reading biometrics to enable access at a distance. However, these current technologies require the establishment and maintenance of an identity management regime.

In order to meet the FIPS-201 standard, the PIV smartcard may need to be carried in a holder that is Radio Frequency (RF) opaque, so that the card cannot be involuntarily accessed. Such access may be both a security and a privacy violation. As a result, the PIV smartcard must be removed from the RF opaque sleeve for PIV registration functions at each new building for physical access at any proximity card reader, e.g. an International Organization for Standardization (ISO) 14443 type card reader, or electronic door opener. Similarly, removal of the PIV smartcard is required for logical access that requires the ability to insert the smartcard into a reader to logically assess on the network. Removing the PIV card frequently causes wear and tear on the sensitive smart chip contacts, and provides great opportunity for the PIV smartcard to be left in a reader or inadvertently lost. When exiting a secure space, the owner may be locked out if he or she forgets the PIV smartcard. An opportunity exists for a thief to access the network when the PIV smartcard is accidentally left in the reader. Each network access exposes the sensitive PIN, so that electronic snooping or shoulder surfing can expose the PIN, allowing a stolen PIV smartcard to be used. These special problems need to be addressed by providing long-range logical and physical access and biometrics enablement of a PIV smartcard.

SUMMARY

A method provides a fingerprint enabled wireless add-on for personal identification number (PIN) accessible smartcards. The method includes powering up a biometric personal identity verification (BioPIV) system, the BioPIV system containing a biometric reader and a holder for a PIV smartcard. The BioPIV system is powered up by receiving a biometric reading from the biometric reader. The method further includes extracting a card holder unique identification (CHUID) from the PIV smartcard and searching for a pre-existing secure domain in an internal memory of the BioPIV system using the CHUID as an index. If a secure domain is found, a signature of the CHUID is validated using data from the secure domain. The secure domain provides a PIN associated with the PIV smartcard, a reference biometric, and a reference hash. The method further includes comparing the biometric provided by the biometric reader with the reference biometric stored in the secure domain. If the biometric provided by the biometric reader matches the reference biometric, the method activates the BioPIV system.

A system for providing a fingerprint enabled wireless add-on for PIN accessible smartcards includes a BioPIV system. The BioPIV system includes a holder for a PIV smartcard, a PIV smartcard reader that reads the PIV smartcard inserted into the holder, and a biometric reader that receives a biometric reading. The receiving of the biometric reading powers up the BioPIV system. The system further includes an internal memory that stores a secure domain. The secure domain stores a reference biometric. The BioPIV system further includes a processor that extracts a card holder unique identification (CHUID) from the PIV smartcard and searches for the secure domain in the internal memory of the BioPIV system using the CHUID as an index, validates a signature of the CHUID using data from the secure domain, compares the biometric provided by the biometric reader with the reference biometric stored in the secure domain, and activates the BioPIV system.

A computer readable medium provides instructions for providing a fingerprint enabled wireless add-on for PIN accessible smartcards. The instructions include powering up a BioPIV system, the BioPIV system containing a biometric reader and a holder for a PIV smartcard. The BioPIV system is powered up by receiving a biometric reading from the biometric reader. The instructions further include extracting a card holder unique identification (CHUID) from the PIV smartcard and searching for a pre-existing secure domain in an internal memory of the BioPIV system using the CHUID as an index. If a secure domain is found, a signature of the CHUID is validated using data from the secure domain. The secure domain provides a PIN associated with the PIV smartcard, a reference biometric, and a reference hash. The instructions further include comparing the biometric provided by the biometric reader with the reference biometric stored in the secure domain. If the biometric provided by the biometric reader matches the reference biometric, the instructions activate the BioPIV system.

DESCRIPTION OF THE DRAWINGS

Exemplary embodiments of the method and system for providing a fingerprint enabled wireless add-on for personal identification number (PIN) accessible smartcards will be described in detail with reference to the following figures, in which like numerals refer to like elements, and wherein.

DETAILED DESCRIPTION

A method and system use a biometric personal identity verification (BioPIV) system to provide a fingerprint enabled wireless add-on for personal identification number (PIN) accessible smartcards. The BioPIV system may function as a trusted biometric reader and a smartcard reader with full remote functionality for both logical and physical access.

Figure 1:
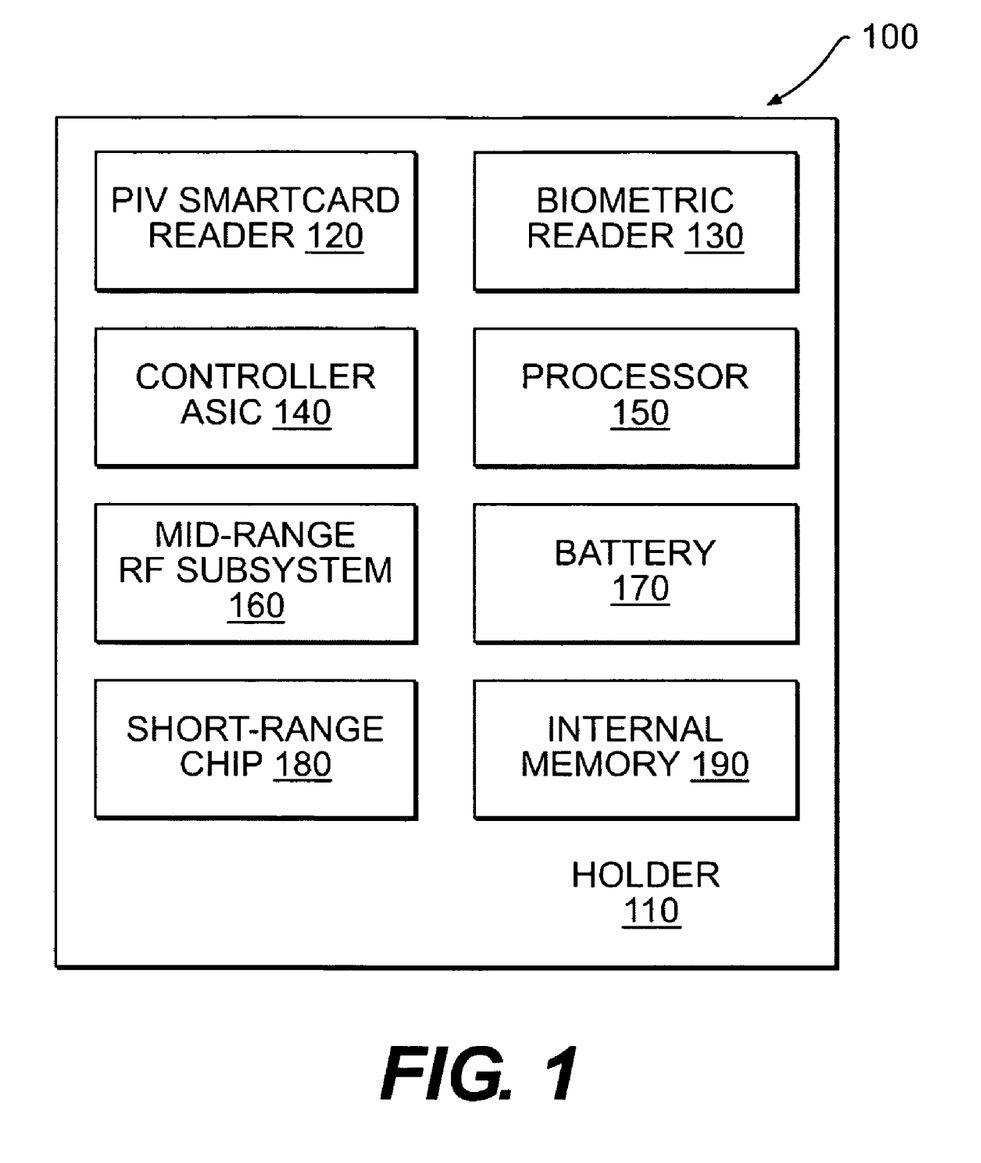
FIG. 1 illustrates an embodiment of an exemplary biometric personal identity verification (BioPIV) system.

FIG. 1 illustrates an embodiment of an exemplary BioPIV system 100. The exemplary BioPIV system 100 may be inert without a personal identification verification (PIV) smartcard inserted. As shown in FIG. 1, the exemplary BioPIV system 100 may include the following components: an optically clear, radio frequency (RF) opaque PIV smartcard holder 110, a smartcard reader 120, a biometric reader 130, an internal memory 190, a controller application specific integrated circuit (ASIC) 140, a processor 150, a user replaceable battery 170, a medium range radio frequency (RF) subsystem and antenna 160, and a short-range chip and antenna 180.

Figure 2:
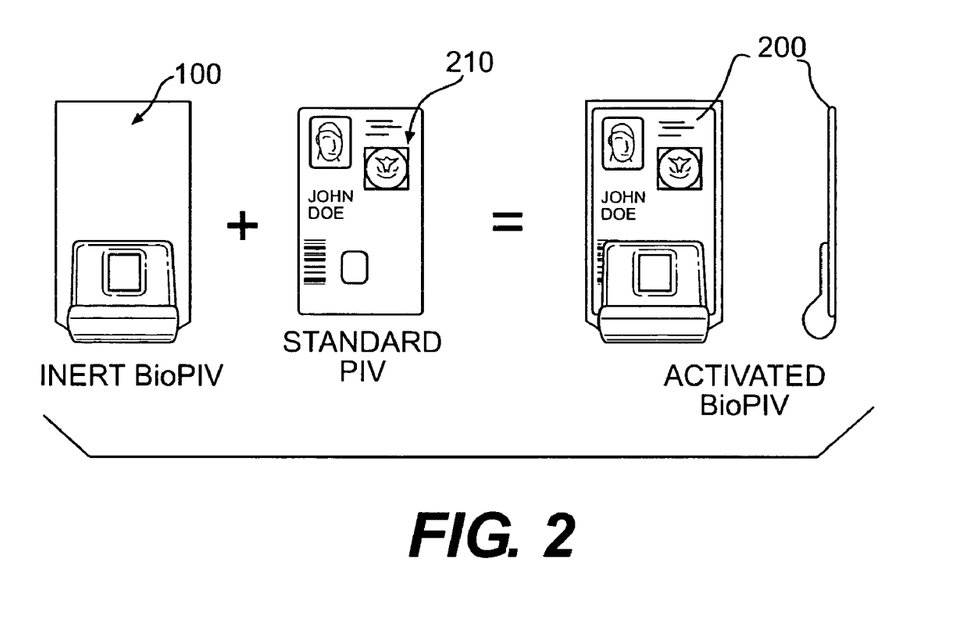
FIG. 2 illustrates an embodiment of a BioPIV system in relation to a personal identification verification (PIV) smartcard.

The PIV smartcard holder 110, which is preferably plastic and may be optically clear and RF opaque on the top half for displaying a standard PIV smartcard 210 (e.g., shown in FIG. 2). The PIV smartcard holder 110 may contain the other components of the BioPIV system 100. The PIV smartcard holder 110 may replace clear plastic smartcard holders that are currently used to safely display standard PIV smartcards. The PIV smartcard holder 110 may be RF opaque to meet the requirements of the FIPS-201 standard.

The smartcard reader 120 may make contact with the PIV smartcard 210 when the latter is inserted into the PIV smartcard holder 110. A PIV smartcard 210 inserted into the BioPIV system 100 may be in contact with the BioPIV system 100 at all times. However, the PIV smartcard 210 itself may be powered up only on demand. The biometric reader 130 (e.g., fingerprint reader) may provide a trusted biometric reading function. The biometric reader 130 is preferably always in the possession of the PIV smartcard holder, ensuring security and providing a sanitary feature so that the user is not repeatedly asked to touch public fingerprint (or other similar) readers. The biometric reader 130 may provide a power-up function of the BioPIV system 100 by receiving a biometric reading from a user. Alternatively, the BioPIV system 100 may be powered up by a separate switch.

The internal memory 190 may include a secure domain for the PIV smartcard. The secure domain typically stores a reference biometric. The ASIC 140, such as a FIPS-140, level 3 controller, may provide tamper-evidence and tamper-proof control of the BioPIV system 100. All data used in the BioPIV system 100 may be protected by the controller ASIC 140. The processor 150 may perform the software functions of the BioPIV system 100, including on-board fingerprint enablement. The medium range RF subsystem and antenna 160 may provide a secure, remote, wireless extension of a network. The RF subsystem 160 has a combination of low latency, long battery life, and medium bandwidth and range. For example, a IEEE 802.15.4 (Zigbee) complied RF subsystem may be used. One skilled in the art will appreciate that other RF implementations can also be used.

The user replaceable battery 170 may provide for a substantial battery capability. The battery 170 may be a standard AAA alkaline battery or a high energy density battery. The short-range chip and antenna 180 may be used to comply with the wireless requirements of the FIPS-201 standard using, for example, an ISO 14443 type short-range wireless chip and antenna. Since the short-range chip and antenna 180 is disabled until the user is biometrically validated, this design complies with HSPD-12's requirement to avoid involuntary operation of a 14443 wireless operation.

As noted above, the BioPIV system 100 may be inert without a PIV smartcard 210 inserted. In other words, by itself, the BioPIV system 100 may not be used for any function. The source of identity and biometrics for the BioPIV system 100 is the PIV smartcard 210. For digital signature functions and PIV biometric access, the BioPIV system 100 may be enrolled with a personal identification number (PIN) to enable it to access non-reputable functions of a smartcard, such as a PIV or Common Access Card (CAC). Non-reputability means that both the PIV and the appropriate fingerprint need to be present in order to authenticate a user and to take an action.

Authentication devices typically operate on three principles, i.e., something you have, something you know, and something you are. The BioPIV system 100 may utilize the three principles, using the PIV smartcard, the PIN, and the fingerprint biometrics, respectively. Specifically, the BioPIV system 100 may be used with the PIV smartcard 210 and the owner/user's fingerprint. The BioPIV system 100 may also possess the user's PIN, and may release the PIN to the PIV smartcard upon presentation of live and valid biometrics, such as a fingerprint.

FIG. 2 illustrates an embodiment of a exemplary BioPIV system 100 in relation to an exemplary PIV smartcard 210. As noted above, the exemplary BioPIV system 100 may be inert by itself. The insertion of a PIV smartcard 210 may activate the BioPIV system 200 by causing electronic connections on the PIV smartcard 210 to make contact with the BioPIV system's embedded smartcard reader 120. To use the BioPIV system 100, a user provides valid biometrics.

Figure 3A:
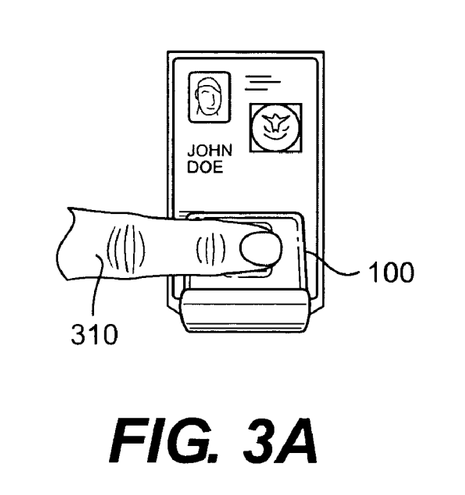
FIGS. 3A and 3B illustrate an exemplary use of an embodiment of a BioPIV system.
Figure 3B:
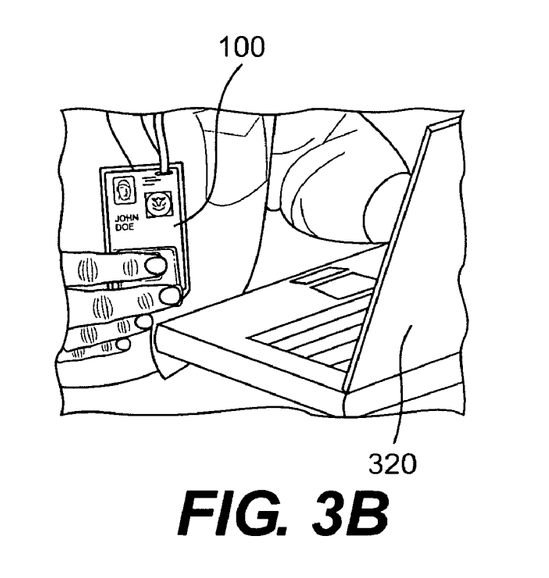

FIGS. 3A and 3B illustrate an exemplary use of an embodiment of a BioPIV system 100. Once a finger 310 is placed on the biometric reader 130 (e.g., shown in FIG. 1), the proper owner of the PIV smartcard 210 may be validated by comparing the fingerprint of the finger 310 on the biometric reader 130 with the signed fingerprint originally obtained from the PIV smartcard 210. Until a match is found, the BioPIV system 100 may remain inert. The BioPIV system 100 maintains privacy by not interacting with unknown and untrusted external systems until obtaining the consent of the BioPIV system's holder. This consent may be, for example, the placement of the finger 310 on the biometric reader 130 of the BioPIV system 100 and the validation of the fingerprint. In embodiments, either index finger can be used (according to the PIV standard), using either a right or left side placement. Activation may include activation of short-range 14443 responses, in accordance with the FIPS-201 standard, for a short duration, as well as activation of medium-range RF, both of which may be shut down after a timed duration unless otherwise noted. FIG. 3B shows a workstation 320 in connection with the activation and registration processes, which will be described in more detail below with respect to FIGS. 4 and 5.

The BioPIV system 100 may include a number of exemplary software functions that are described below. One skilled in the art will readily appreciate that other uses of the BioPIV system 100 are possible.

Figure 4:
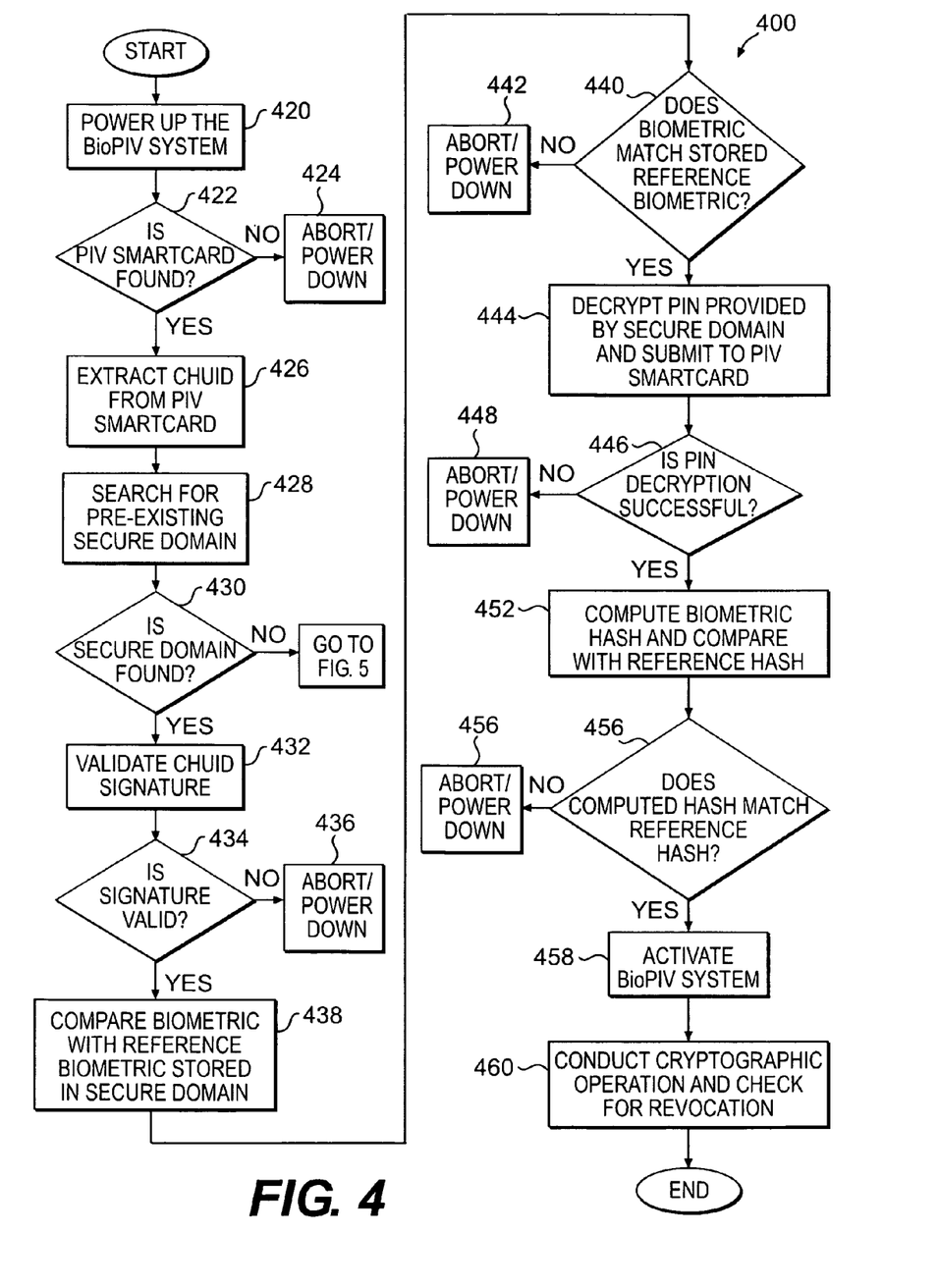
FIG. 4 is a flow chart illustrating an embodiment of a BioPIV activation process.

FIG. 4 is a flow chart illustrating an embodiment of a BioPIV activation process 400. The BioPIV system 100 may be activated if the BioPIV system 100 has been previously registered (BioPIV system registration will be described later with respect to FIG. 5). As noted above, a finger 310 placed on the biometric reader 130 may power up the BioPIV system 100 (block 420). After the BioPIV system 100 is powered up, the BioPIV system 100 may search for the PIV smartcard 210 (block 422). If a PIV smartcard 210 is not found, the BioPIV system 100 powers down and the activation process is aborted (block 424). Otherwise, the BioPIV system 100 may extract a card holder unique identification (CHUID) from the PIV smartcard 210 (block 426). No PIN is required to read the CHUID. The BioPIV system 100 may then search for a pre-existing secure domain (block 428) for the specific PIV smartcard 210 using the CHUID as an index. The BioPIV system 100 may search its own internal memory 190 for the PIV smartcard 210 secure domain. Failure to find a matching secure domain may mean that a BioPIV PIN registration is in process, and the flow goes to FIG. 5 (the registration process). If, on the other hand, a matching secure domain is detected (block 430), the BioPIV system 100 may validate a signature of the CHUID using data from the secure domain (block 432). An invalid CHUID signature may abort the process (block 436).

If the CHUID signature is valid (block 434), the BioPIV system 100 may read the real-time biometric (e.g., fingerprint) from the biometric reader 130, convert the biometric to an internal template format, and compare the real-time biometric with a reference biometric stored in the secure domain (block 438). If the real-time biometric does not match the stored reference template from the secure domain (block 440), the process is aborted (block 442). Otherwise, the BioPIV system 100 may decrypt a PIN, which is provided by the secure domain, and may submit the decrypted PIN to the PIV smartcard 210 (block 444). If the PIN decryption is not successfully (block 446), the BioPIV system 100 powers down (block 448). If, however, the PIN decryption is successful (block 446), the BioPIV system 100 may compute a biometrics hash using the reference biometric provided by the PIV smartcard 210 and compare the computed biometrics hash with a reference hash stored in the secure domain (block 452). If the biometric hashes do not match (block 454), the BioPIV system 100 powers down (block 456). Otherwise, the BioPIV system 100 may be activated (block 458).

Finally, the BioPIV system 100 may conduct a cryptographic operation, checking for revocation (block 460). The cryptographic operation may prove that the private key of the PIV smartcard matches the certificate on the PIV smartcard 210, using the PIV authentication certificate. Determination of revocation status may await any attempt to use the PIV smartcard 210 for physical registration or logical access, avoiding the need to make a real-time decision of revocation. After the BioPIV system 100 is activated, the BioPIV system 100 may await further actions for N seconds (not shown). After activation, the BioPIV system 100 may respond to short-range 14443 queries with the requested FIPS-201 response (not shown). The medium-range link may also be activated (not shown).

Figure 5:
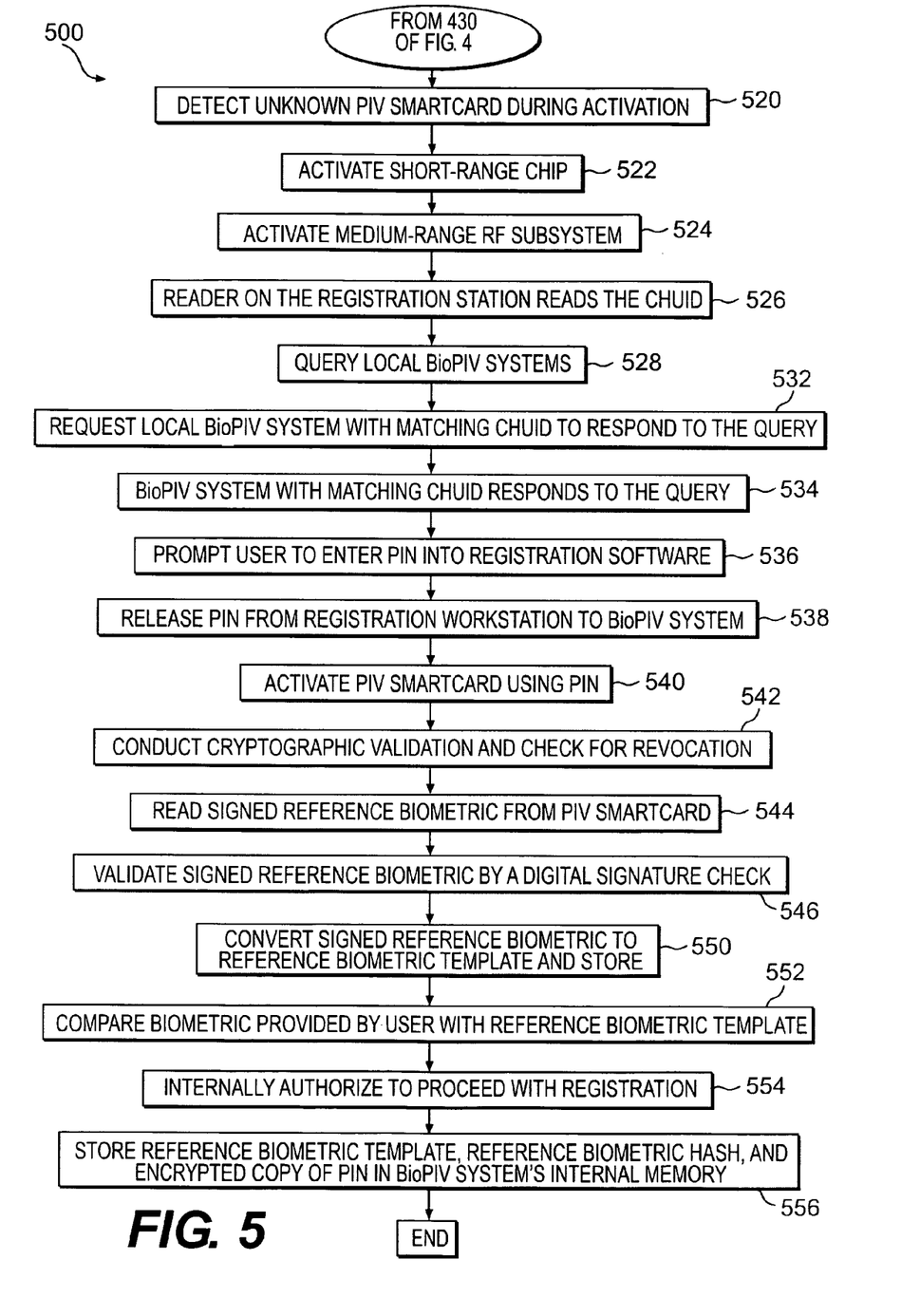
FIG. 5 is a flow chart illustrating an embodiment of a BioPIV PIN and fingerprint registration process.

FIG. 5 is a flow chart illustrating an embodiment of a BioPIV PIN and fingerprint registration process 500. As noted above, the BioPIV system 100 may be activated by applying one of the owner's index fingers to the BioPIV system 100. If during the activation process 400 of FIG. 4, an unknown PIV smartcard 210 is detected (block 520), the BioPIV system 100 may conduct the exemplary registration process 500 for a new PIV smartcard 210. The detection of an unknown PIV smartcard may be the result of reading the CHUID and not finding a matching secure domain in the BioPIV system's internal memory 190 (block 430 of FIG. 4). The BioPIV system 100 may then be activated using the exemplary registration process 500.

The BioPIV system 100 may activate the on-board short-range chip and antenna 180 (block 522), which may respond for approximately six seconds, for example, to a 14443 query with the appropriate CHUID. The BioPIV system 100 may activate the medium-range RF subsystem and antenna 160 (block 524), which may respond to queries for a BioPIV system 100 with a matching Federal Agency Smart Credential Number (FASC-N), for example. The FASC-N may be contained in the CHUID that is extracted at the start of the registration process (block 426 in FIG. 4). The BioPIV system 100 may be positioned by the user into proximity of a 14443 reader on the registration workstation 320 (shown in FIG. 3B), which reads the CHUID (block 526). The registration workstation 320 may query local BioPIV systems 100 (block 528), using the medium-range link. The registration workstation 320 may then request a local BioPIV system 100 with a matching CHUID to respond to the request after establishing a secure channel (block 532). The BioPIV system 100 with the matching CHUID may then respond to the 14443 query (block 534). This response allows the workstation's registration software to determine the correct BioPIV system 100.

The user may be prompted to enter his or her PIN into the registration software (block 536). The PIN may be released from the registration workstation 320 to the BioPIV system 100 over the secured channel, along with cryptographic signature validation material (block 538). The PIN may be used to activate the PIV smartcard 210 (block 540). Failure to activate the PIV smartcard 210 or the failure of any subsequent digital signature check may abort the registration process 500 (not shown).

The registration workstation 320 may perform a cryptographic validation of the PIV authentication certificate, checking for revocation (block 542). The BioPIV system 100 may then read the signed reference biometric from the PIV smartcard 210 (block 544) and may validate the signed reference biometric by a digital signature check (block 546). The hash of the signed reference biometric may be stored for future use. The BioPIV system 100 may convert the signed reference biometric (e.g., fingerprint wavelets) to the internal biometrics template to be stored for future use (block 550). The BioPIV system 100 may compare a live biometric (e.g., fingerprint) provided by the user with the reference biometric template (block 552). If a match occurs, the BioPIV system 100 may be internally authorized to proceed with registration (block 554). During this registration process 500, the reference biometric template, the reference biometric hash, and an encrypted copy of the PIN may be stored under the indexing CHUID in the security domain created for the newly registered PIV smartcard 210 (block 556).

The exemplary BioPIV system 100 may register multiple PIV smartcards 210, limited, for example, by the available memory size of the BioPIV system 100 at the time of fabrication. The BioPIV system 100 may also register multiple smartcards 210 from multiple people. For example, a single person may use both a federal employee PIV smartcard and a PIV smartcard from a state that uses the PIV standard to issue PIV compliant driver's licenses. Similarly, dependents in a military family may share a single BioPIV system for rapid access to a base commissary. Likewise, a single BioPIV system 210 may be shared by a work crew that shares a workstation 320 on, for example, a 24×7 rotation. If the secure domain storage of a BioPIV system 100 is exceeded, the oldest secure domain may be deleted and reused.

The BioPIV system 100 may allow single sign-on processes based on, for example, Kerberos PKIINIT. PKIINIT is a method used by Windows systems and available on Linux systems. The Kerberos single sign-on process may require that the PIV smartcard 210 with a certificate and private key be plugged into the workstation 320. During sign-on, a Kerberos server may send a nonce to be signed by the PIV smartcard 210. The nonce may be encrypted with the private key on the PIV smartcard 210, after approval for the signing function is obtained by a PIN entry. The signed nonce may be sent back to the server with a public certificate. If the public certificate represents a valid credential for the network, and if the nonce decrypts properly using the public key from the certificate, the server may create a "ticket generating ticket" (TGT). The TGT may be encrypted using the public key of the certificate, and may then be sent back to the workstation 320. The workstation 320 may decrypt the TGT by using the private key to decrypt the TGT symmetric key.

The BioPIV system 100 may include the ability to support this single sign-on process as a "wireless" and trusted smartcard reader. Once activated by a finger press and validated as described above with respect to FIG. 4, the BioPIV system 100 may be active for approximate six seconds, for example, to respond to 14443 queries and to queries over long-range RF. To perform a single sign-on process, the user may hold the BioPIV system 100 near the 14443 reader supplied with the BioPIV single sign-on reader (not shown) and perform the connection process described above with respect to FIG. 5. Alternately, the CHUID of the BioPIV attempting logon may be obtained by lookup, using the user ID typed in at the logon screen. Regardless of the method of obtaining the FASC-N from the CHUID, a specific BioPIV system 100 can be reliably selected by transmitting the FASC-N of the BioPIV system 100, which may then respond to a specific secure connection attempt. At the completion of the selection of the specific BioPIV system 100, a medium-range secure channel may be established between the reader of the workstation 230 and the selected BioPIV system 100. The PIV smartcard 210 may be verified cryptographically, biometrically, and using PIV digital signatures. The BioPIV system 100 may be allowed to respond with one digital signature and one decryption for approximately six seconds, for example. The workstation 230 may perform a Kerberos authentication process, as described above. A nonce may be sent from the Kerberos server and signed by the PIV smartcard 210 using the secure channel that has been established. The nonce may be signed using the non-repudiation key on the PIV smartcard 210. The certificate may also be returned, allowing PKIINIT to validate and issue the appropriate TGT, which may be decrypted by the PIV smartcard 210 using the same secure channel.

Figure 6A:
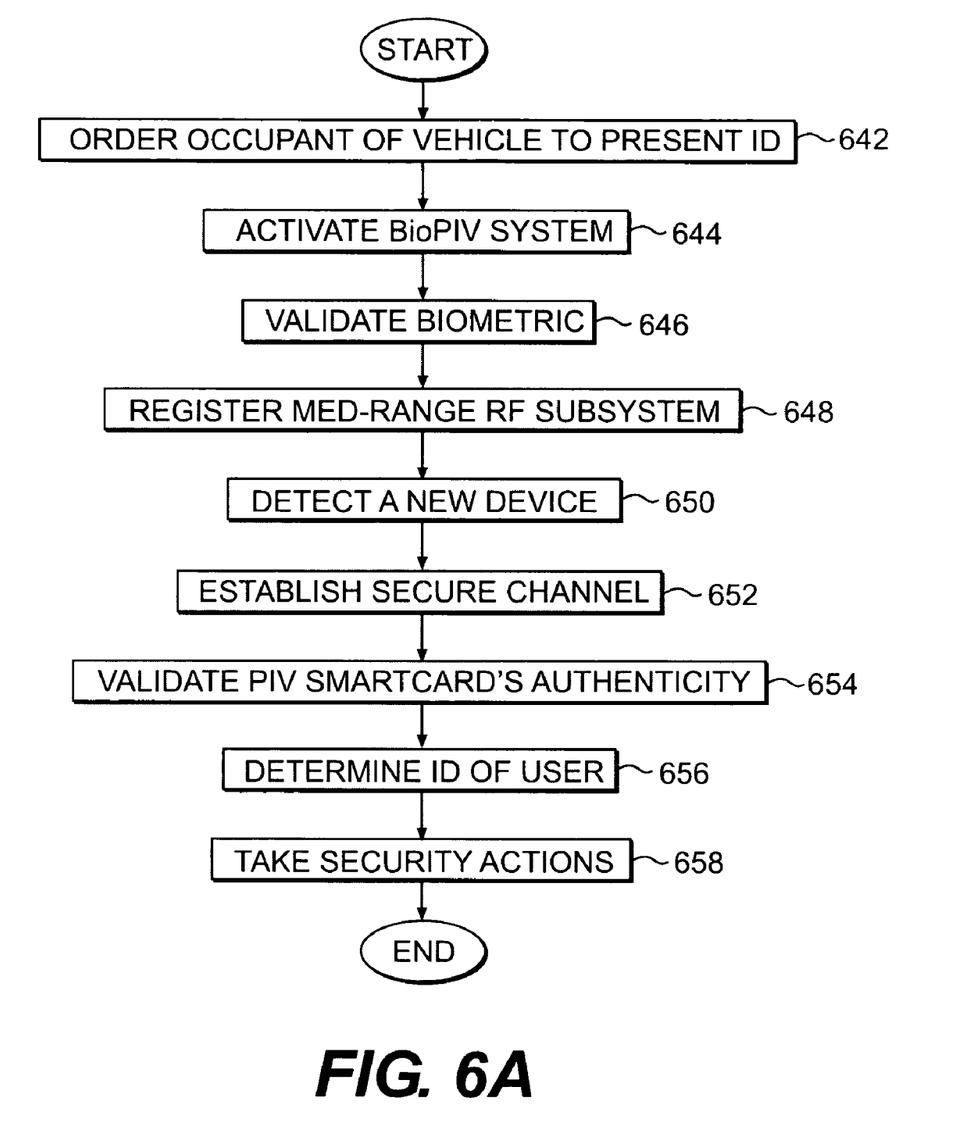
FIGS. 6A and 6B show an exemplary use of an embodiment of the BioPIV system in a remote road block situation.
Figure 6B:
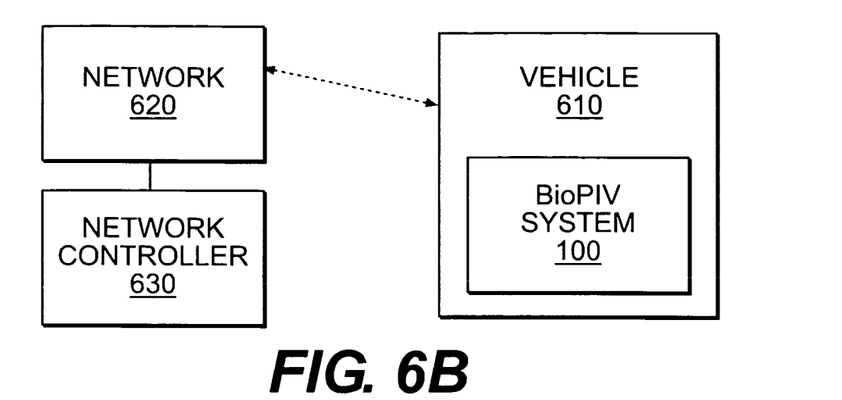

FIGS. 6A and 6B show an exemplary use of an embodiment of the BioPIV system 100 in a remote road block situation. Stopping a potential vehicle bomb and demanding identification of the driver and passengers may be dangerous. The BioPIV system 100 may allow the use of a remotely operated barrier available from many vendors. Referring to FIG. 6A, an occupant of the vehicle 610 may be ordered remotely to present his or her PIV identification (block 642). The occupant may activate his or her BioPIV system 100 using his or her fingerprint (block 644). Activation of the BioPIV system 100 is described above with respect to FIG. 4. The PIN, the biometrics, and the PKI authentication certificate may be validated (block 646). Once activated, the medium-range RF subsystem 140 may register into a road block RF network 620 (shown in FIG. 6B) (block 648). A road block network controller 630 may detect a new device being added (block 650). The controller 630 may establish a secure channel and may request the CHUID (block 652). A cryptographic validation of the PIV authentication certificate may allow the road block to determine that the PIV smartcard 210 is authentic, not revoked, and current (block 654). The identity of the user may be determined from the CHUID (block 656). Failure to authenticate provides security forces any number of options, such as detonating the vehicle, forcing the evacuation, and disrobing of occupants at gunpoint (e.g., at 200 feet) (block 658).

Figure 7:
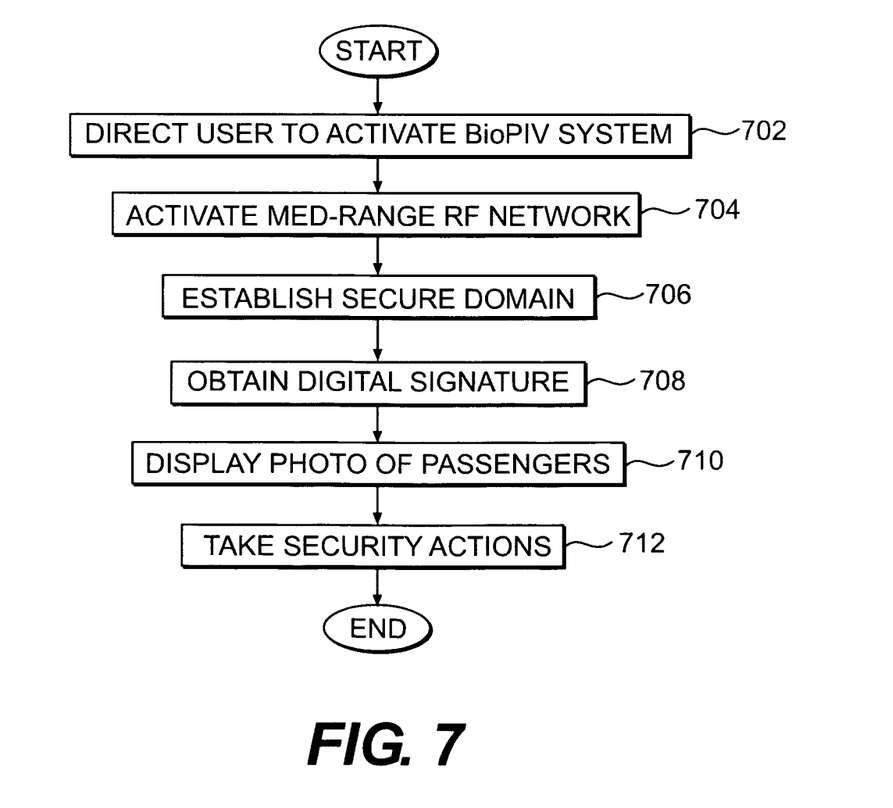
FIG. 7 is a flow chart illustrating an exemplary use of the embodiment of the BioPIV system in a fast vehicle access situation.

FIG. 7 is flow chart illustrating an exemplary use of an embodiment of the BioPIV system 100 in a fast vehicle access situation. In many continental United States (CONUS) facilities, functionality is the issue rather than safety. Vehicles may need to be moved rapidly onto a facility. At many locations in the United States, the imposition of higher alert levels often results in long lines and significant work force delays. With the FIPS-201 standard, a facility may register PIV smartcards 210 for access to the facility using their existing security office. Using the BioPIV system 100, the facility may allow access at highway speed. As a user approaches an access portal, signage may direct the user to activate his or her BioPIV system 100 (block 702). The BioPIV system 100 may be activated as described above with respect to FIG. 4. The medium-range RF network 620 (shown in FIG. 6B) may be activated (block 704). The automatic access gate may establish a secure channel and obtain the CHUID. Optionally, a digital signature may be obtained for the highest security (block 708). If gathered during the base registration process, the photo of the authenticated passengers may be displayed to the guard (block 710), who may, if suspicious, activate security barriers to provide time for the vehicle to stop and be redirected to a security office (block 712). Policies may provide that only the driver be authenticated. Alternatively, all passengers may need to be independently authenticated. The rapid acquisition time of the PIV of the driver and each passenger may enable necessary transfers to be conducted. Policies may require full stop, slow roll, or fast roll, depending on the local rules.

The exemplary BioPIV system 100 may be used for PIV site registration. The BioPIV system 100 may maintain the full functionality of the card-edge PIV smartcard registration.

A visitor that arrives at a BioPIV-enabled building PIV registration site may be registered without plugging his or her PIV smartcard 210 into a foreign system. Similarly, the visitor does not need to touch an unsanitary fingerprint reader that requires frequent cleaning for hygiene and accuracy. This functionality may speed up the process of registering persons from the same organization into new buildings and bases. Any physical site that supports the drive-on capability as described above with respect to FIG. 7 may be candidates for the ability to register the PIV smartcard 210 using the BioPIV wireless functionality. Many buildings may depend on the BioPIV system 100 for internal building access as discussed below, and for that reason, the BioPIV system 100 may provide a fast and efficient registration process.

The exemplary BioPIV system 100 may also be used for fast building access. The BioPIV system 100 may allow manned access or unmanned access at high rates, using the built-in medium range RF subsystem 160 (shown in FIG. 1). The PIV smartcard user may be prompted to press a finger on the BioPIV system 100. The user's PIV smartcard 210 may be validated and access may be quickly authorized. Manned access may display the photo (if collected during PIV registration for the building) of each person transiting the hallway, providing the guard the ability to verify authorized access. A guard may be augmented or replaced by available head count portals available from many manufacturers.

As noted above, a PIV smartcard user may activate his or her BioPIV system 100 with a finger press, thus saving the time of removing and reinserting the PIV smartcard 210 into a RF opaque holder as required by the FIPS-201 standard. Therefore, standard 14443 portal equipments may continue to be used in connection with the BioPIV system 100 without modification.

Once a single sign-on function is completed, the BioPIV system 100 may enter a workstation locking mode, providing the ability to terminate a single sign-on in a controlled and reliable manner. The locking mode may provide reduced power operations and may maintain a low rate ping between the signed-on workstation and the BioPIV system. Periodically, e.g., once a second, the BioPIV system 100 may ping the workstation 320 and the workstation 320 may ping the BioPIV system 100 through the secure channel established during logon. As long as the smartcard user remains within, for example, approximately ten feet of the workstation 320, the workstation 320 may remain active. Each side independently maintains its assurance that the other is within close proximity, by monitoring the signal strength. When the workstation 320 determines that the BioPIV system 100 has exited its close vicinity, the workstation 320 may cease its ping and may lock the workstation 320 to await the return of the user. When the BioPIV system 100 determines that its owner has left the vicinity of the workstation 320, the BioPIV system 100 may cease its pings and may inhibit its ability to perform the non-reputable general key operations described below. Inhibition of general key operations is important to prevent the accidental use of a non-repudiation signature in an inappropriate location. This ping mode may provide an automatic and reliable return to radio silence, and may allow for the BioPIV system 100 to shut down to save power. When the user returns, he or she may need to initiate a new sign-on and unlock the workstation 320.

The BioPIV system 100 may provide general private key access by performing digital signature encryption and decryption. Encryption and decryption may be enabled while in a current single sign-on session and may be accomplished over the secure channel, which is smartcard independent. Once a user is signed on to a workstation 320, the workstation 320 may require additional digital signatures for web access, for signing documents and emails, and for encrypting and decrypting files and emails. The appropriate certificate (as identified by key usage) may be determined, and the private key may be used to encrypt or decrypt a hash. To access the private keys of the PIV smartcard 210, the smartcard user may give additional consent by pressing his or her finger 310 on the BioPIV system 100. Once the ping mode described above has been established, the smartcard user may remove his or her finger 310 before any additional signatures can occur. The user may be prompted by the wireless reader software to sign or decrypt a document. The finger 310 may be pressed again to allow either a signature or decryption. The validation process described above with respect to FIG. 4 may occur for each signature. Each key operation may require a separate finger press to keep workstation malware from obtaining illicit signatures, encryptions, or decryptions.

Figure 8:
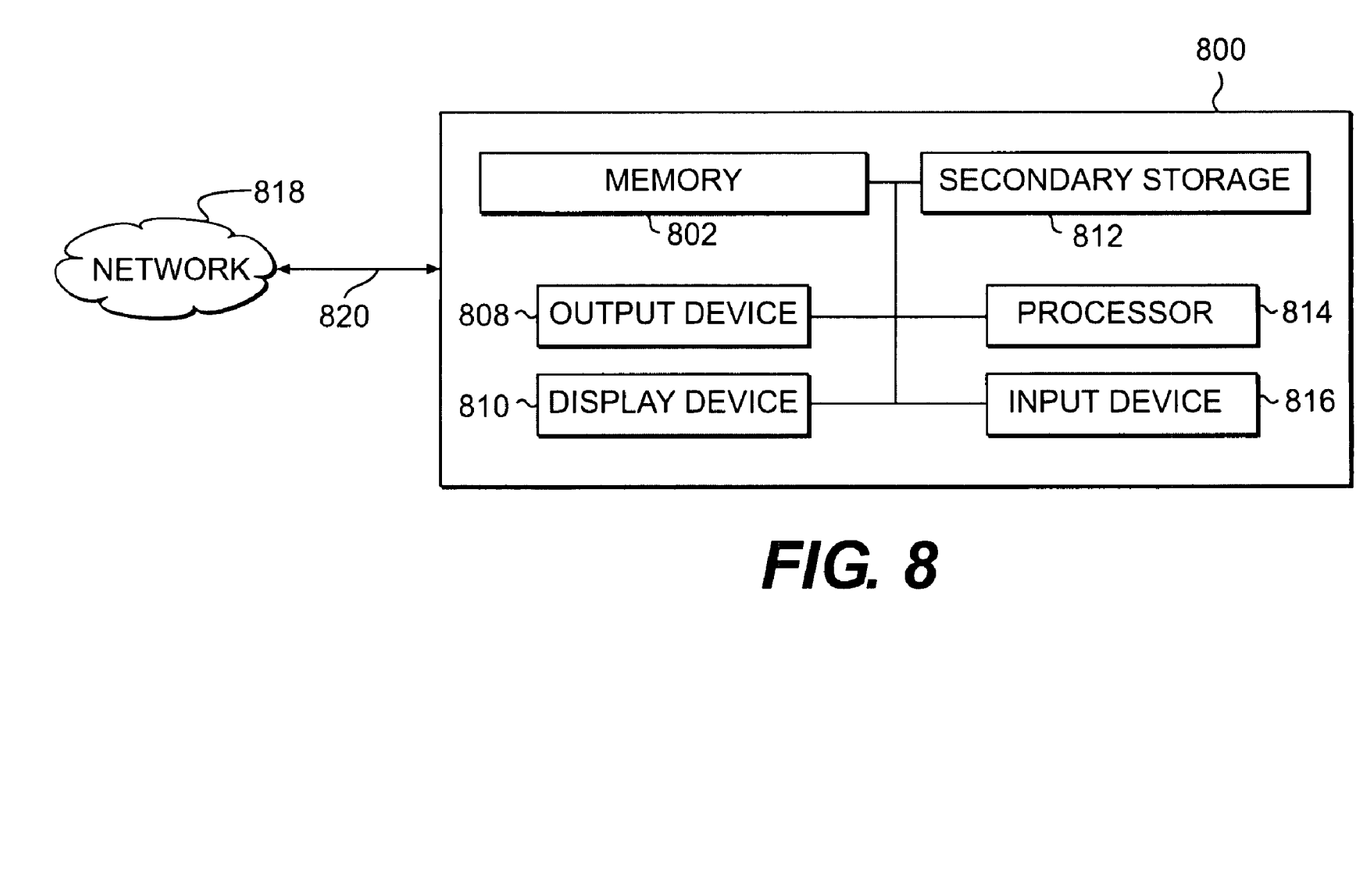
FIG. 8 illustrates exemplary hardware components of a computer that may be used in connection with an exemplary method for providing a fingerprint enabled wireless add-on for PIN accessible smartcards.

FIG. 8 illustrates exemplary hardware components of a computer 800 that may be used in connection with the method for providing a fingerprint enabled wireless add-on for PIN accessible smartcards. The computer 800 includes a connection 820 with a network 818 such as the Internet or other type of computer or telephone network. The network 818 may be a wired network or a wireless network. The connection 820 may be an RF connection 820. The computer 800 may interact with the BioPIV system 80 through the connection 820. The computer 800 typically includes a memory 802, a secondary storage device 812, a processor 814, an input device 816, a display device 810, and an output device 808.

The memory 802 may include random access memory (RAM) or similar types of memory. The secondary storage device 812 may include a hard disk drive, floppy disk drive, CD-ROM drive, or other types of non-volatile data storage, and may correspond with various databases or other resources. The processor 814 may execute information stored in the memory 802, the secondary storage 812, or received from the Internet or other network 130. The input device 816 may include any device for entering data into the computer 800, such as a keyboard, keypad, cursor-control device, touch-screen (possibly with a stylus), or microphone. The display device 810 may include any type of device for presenting visual image, such as, for example, a computer monitor, flat-screen display, or display panel. The output device 808 may include any type of device for presenting data in hard copy format, such as a printer, and other types of output devices including speakers or any device for providing data in audio form. The RF connection 820 may include a short-range connection, for example, a 14443 interface, and it may include a medium-range RF interface such as a Bluetooth or Zigbee. The computer 800 can possibly include multiple input devices, output devices, and display devices.

Although the computer 800 is depicted with various components, one skilled in the art will appreciate that the computer 800 can contain additional or different components. In addition, although aspects of an implementation consistent with the method for providing a fingerprint enabled wireless add-on for PIN accessible smartcards are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling the computer 800 to perform a particular method.

While the method and system for providing a fingerprint enabled wireless add-on for PIN accessible smartcards have been described in connection with an exemplary embodiment, those skilled in the art will understand that many modifications in light of these teachings are possible, and this application is intended to cover variations thereof.

What is claimed is:

1. A method for providing a fingerprint enabled wireless add-on for personal identification number (PIN) accessible smartcards, comprising:
   powering up a biometric personal identity verification (BioPIV) system, the BioPIV system containing a biometric reader and a holder for a PIV smartcard, wherein the BioPIV system is powered up by receiving a biometric reading from the biometric reader;
   extracting a card holder unique identification (CHUID) for the PIV smartcard;
   searching for a secure domain in an internal memory of the BioPIV system using the CHUID as an index, wherein the internal memory is contained within the BioPIV and is co-located with the holder and the biometric reader;
   if a secure domain is found, validating a signature of the CHUID using data from the secure domain, wherein the secure domain provides a PIN associated with PIV smartcard, a reference biometric, and a reference hash;
   comparing the biometric provided by the biometric reader with the reference biometric stored in the secure domain; and
   if the biometric provided by the biometric reader matches the reference biometric, activating the BioPIV system.

2. The method of claim 1, wherein the powering up step includes receiving a fingerprint from the biometric reader.

3. The method of claim 1, wherein the powering up step includes activating a switch.

4. The method of claim 1, further comprising:
   if the biometric provided by the biometric reader matches the reference biometric, decrypting the PIN provided by the secure domain and submitting the decrypted PIN to the PIV smartcard;
   computing a biometric hash using the reference biometric provided by the PIV smartcard;
   comparing the computer biometric hash with the reference hash provided by the secure domain; and
   if the computed biometric hash matches the reference hash, activating the BioPIV system.

5. The method of claim 1, further comprising:
   if a secure domain is not found, registering the BioPIV system with a workstation.

6. The method of claim 5, further comprising:
   activating a short-range chip located on the BioPIV system, the short-range chip can respond to a short-range query with an appropriate CHUID;
   activating a medium-range radio frequency (RE) subsystem located on the BioPIV system, the medium-range RE subsystem can respond to queries for the BioPIV system with a matching Federal Agency Smart Credential Number (FASC-N), wherein the FASC-N is contained in the CHUID extracted from the PIV smartcard;
   using a reader on the workstation to read the CHUID extracted from the PIV smartcard;
   requesting a local BioPIV system with a matching CHUID to respond to the queries;
   prompting a user to enter a PIN into the workstation;
   releasing the PIN from the workstation to the BioPIV system over a secured channel; and
   activating the BioPIV system using the PIN.

7. The method of claim 6, further comprising querying local BioPIV systems using a medium-range link by the workstation.

8. The method of claim 6, further comprising:
   passing cryptographic signature validation materials from the workstation to the BioPIV system; and
   conducting a cryptographic validation to check for revocation.

9. The method of claim 6, further comprising:
   reading a signed reference biometric from the PIV smartcard;
   validating the signed reference biometric by a digital signature check;
   comparing the biometric provided by the biometric reader with the signed reference biometric;
   if the biometric provided by the biometric reader matches the signed reference biometric, authorizing the registration of the BioPIV system.

10. The method of claim 9, further comprising:
    converting the signed reference biometric to an interval reference biometric template;
    storing the interval reference biometric template for further use; and
    storing a hash of the signed reference biometric for future use.

11. The method of claim 9, further comprising:
    creating a secure domain for a newly registered BioPIV system; and
    storing a signed reference biometric and an encrypted copy of the PIN under the CHUID in the secure domain.

12. The method of claim 1, further comprising:
    reading the biometric provided by the biometric reader; and
    converting the biometric to an internal template format.

13. The method of claim 1, further comprising providing a single sign-on process.

14. The method of claim 13, further comprising entering a workstation locking mode to ensure security.

15. The method of claim 1, wherein the BioPIV system provides a PIN check for remote road blocks.

16. The method of claim 1, wherein the BioPIV system provides a PIN check for fast vehicle access.

17. The method of claim 1, wherein the BioPIV system provides a personal identity verification (PIV) site registration.

18. The method of claim 1, further comprising using a controller application specific integrated circuit (ASIC) to provide tamper-evidences and a tamper-proof control of the BioPIV system.

19. The method of claim 1, further comprising providing a private key access by performing digital signature encryption and decryption.

20. A system for providing a fingerprint enabled wireless add-on for personal identification number (PIN) accessible smartcards, comprising:
    a biometric personal identity verification (BioPIV) system, comprising:
    a holder for a PIV smartcard;
    a PIV smartcard reader that reads the PIV smartcard inserted into the holder;
    a biometric reader that receives a biometric reading, wherein the receiving of the biometric reading powers up the BioPIV system;
    an internal memory that stores a secure domain, the secure domain storing a reference biometric; and
    a processor that extracts a card holder unique identification (CHUID) from the PIV smartcard and searches for the secure domain in the internal memory of the BioPIV system using the CHUID as an index, validates a signature of the CHUID using data from the secure domain, compares the biometric provided by the biometric reader with the reference biometric stored in the secure domain, and activates the BioPIV system, wherein the holder, PIV smartcard reader, biometric reader, internal memory and processor are physically co-located together and contained within the BioPIV system.

21. The system of claim 20, wherein the holder is an optically clear, radio frequency (RF) opaque holder.

22. The system of claim 20, wherein the biometric reader receives a fingerprint from a user when the user presses a finger on the biometric reader.

23. The system of claim 20, wherein the BioPIV system further comprising a controller application specific integrated circuit (ASIC) that provides tamper-evidences and a tamper-proof control of the BioPIV system.

24. The system of claim 20, wherein the BioPIV system further comprising:
  a short-range chip that responds to a short-range query with an appropriate CHUID;
  a medium-range radio frequency (RF) subsystem that responds to queries for the BioPIV system with a matching Federal Agency Smart Credential Number (FASC-N), wherein the FASC-N is contained in the CHUID extracted from the PIV smartcard.

25. The system of claim 20, wherein the BioPIV system further comprising a user replaceable battery.

26. A tangible computer readable medium providing instructions, stored on the tangible computer readable medium, for providing a fingerprint enabled wireless add-on for personal identification number (PIN) accessible smartcards, executed by a processor in communication with the tangible computer readable medium, the instructions comprising:
  powering up a biometric personal identity verification (BioPIV) system, the BioPIV system containing a biometric reader and a holder for a PIV smartcard, wherein the BioPIV system is powered up by receiving a biometric reading from the biometric reader;
  extracting a card holder unique identification (CHUID) from the PIV smartcard;
  searching for a secure domain in an internal memory of the BioPIV system using the CHUID as an index, wherein the internal memory is contained within the BioPIV and is co-located with the holder and the biometric reader;
  if a secure domain is found, validating a signature of the CHUID using data from the secure domain, wherein the secure domain provides a PIN associated with the PIV smartcard, a reference biometric, and a reference hash;
  comparing the biometric provided by the biometric reader with the reference biometric stored in the secure domain; and
  if the biometric provided by the biometric reader matches the reference biometric, activating the BioPIV system.

27. The computer readable medium of claim 26, wherein the instructions for powering up include instructions for activating a switch.

28. The computer readable medium of claim 26, further comprising instructions for:
  if the biometric provided by the biometric reader matches the reference biometric, decrypting the PIN provided by the secure domain and submitting the decrypted PIN to the PIV smartcard;
  computing a biometric hash using the reference biometric provided by the PIV smartcard;
  comparing the computed biometric hash with the reference hash provided by the secure domain; and
  if the computed biometric hash matches the reference hash, activating the BioPIV system.

29. The computer readable medium of claim 26, further comprising instructions for:
  if a secure domain is not found, registering the BioPIV system with a workstation.

30. The computer readable medium of claim 26, further comprising instructions for:
  activating a short-range chip located on the BioPIV system, the short-range chip can respond to a short-range query with an appropriate CHUID;
  activating a medium-range radio frequency (RF) subsystem located on the BioPIV system, the medium-range RF subsystem can respond to queries for the BioPIV system with a matching Federal Agency Smart Credential Number (FASC-N), wherein the FASC-N is contained in the CHUID extracted from the PIV smartcard;
  using a reader on the workstation to read the CHUID extracted from the PIV smartcard;
  requesting a local BioPIV system with a matching CHUID to respond to the queries;
  prompting a user to enter a PIN into the workstation;
  releasing the PIN from the workstation to the BioPIV system over a secured channel; and
  activating the BioPIV system using the PIN.

31. The computer readable medium of claim 26, further comprising instructions for:
  reading a signed reference biometric from the PIV smartcard;
  validating the signed reference biometric by a digital signature check;
  comparing the biometric provided by the biometric reader with the signed reference biometric;
  if the biometric provided by the biometric reader matches the signed reference biometric, authorizing the registration of the BioPIV system.

32. The computer readable medium of claim 26, further comprising instructions for providing a single sign-on process.

33. The computer readable medium of claim 32, further comprising instructions for entering a workstation locking mode to ensure security.

34. The computer readable medium of claim 26, further comprising instructions for using a controller application specific integrated circuit (ASIC) to provide tamper-evidences and a tamper-proof control of the BioPIV system.

35. The computer readable medium of claim 26, further comprising instructions for providing a private key access by performing digital signature encryption and decryption.

* * * * *